(12) United States Patent
Demmers et al.

(10) Patent No.: US 8,475,570 B2
(45) Date of Patent: Jul. 2, 2013

(54) PROCESS FOR PRODUCING PURIFIED GAS FROM GAS COMPRISING $H_2S$, $CO_2$ AND HCN AND/OR COS

(75) Inventors: Anthonius Maria Demmers, Amsterdam (NL); Sandra Schreuder, Amsterdam (NL)

(73) Assignee: Shell Oil Company, Houston, TX (US)

( * ) Notice: Subject to any disclaimer, the term of this patent is extended or adjusted under 35 U.S.C. 154(b) by 403 days.

(21) Appl. No.: 12/671,064

(22) PCT Filed: Jul. 28, 2008

(86) PCT No.: PCT/EP2008/059843
§ 371 (c)(1),
(2), (4) Date: Jun. 9, 2010

(87) PCT Pub. No.: WO2009/016139
PCT Pub. Date: Feb. 5, 2009

(65) Prior Publication Data
US 2010/0236407 A1    Sep. 23, 2010

(30) Foreign Application Priority Data

Jul. 31, 2007  (EP) .................................. 07113576

(51) Int. Cl.
*B01D 53/14* (2006.01)
(52) U.S. Cl.
USPC ................ 95/159; 95/160; 95/161; 95/163; 95/176; 95/199; 95/223; 95/232; 95/235; 95/236; 423/220; 423/236; 423/242.1
(58) Field of Classification Search
USPC ................ 95/161, 159, 160, 163, 199, 204, 95/223, 176, 232, 235, 236, 172, 173, 191, 95/192, 208, 207; 422/190; 423/220, 236, 423/242.1
See application file for complete search history.

(56) References Cited

U.S. PATENT DOCUMENTS 3,966,875 A * 6/1976 Bratzler et al. ............... 423/220
4,189,307 A   2/1980 Marion ....................... 48/197 R
(Continued)

FOREIGN PATENT DOCUMENTS
EP         661373      7/1995
WO       WO9912847    3/1999

OTHER PUBLICATIONS http://www.jgc.co.jp/en/04tech/01gas/cos_hcn.html.*

(Continued)

*Primary Examiner* — Duane Smith
(74) *Attorney, Agent, or Firm* — Charles W. Stewart

(57) ABSTRACT

The invention provides a process for producing purified gas from feed gas comprising $H_2S$, $CO_2$ and HCN and/or COS, the process comprising the steps of: (a) contacting feed gas comprising $H_2S$, $CO_2$ and HCN and/or COS with a HCN/COS hydrolysis sorbent in the presence of water in a HCN/COS hydrolysis unit, thereby obtaining gas depleted in HCN and/or COS; (b) contacting the gas depleted in HCN and/or COS with absorbing liquid in an $H_2S/CO_2$ absorber to remove $H_2S$ and $CO_2$, thereby obtaining the purified gas and absorbing liquid rich in $H_2S$ and $CO_2$; (c) heating and de-pressurizing at least part of the absorbing liquid rich in $H_2S$ and $CO_2$ to obtain hot flash gas enriched in $CO_2$ and absorbing liquid enriched in $H_2S$; (d) contacting the absorbing liquid enriched in $H_2S$ at elevated temperature with a stripping gas, thereby transferring $H_2S$ to the stripping gas to obtain regenerated absorbing liquid and stripping gas rich in $H_2S$; and (e) leading at least part of the flash gas enriched in $CO_2$ to the HCN/COS hydrolysis unit and/or to the $H_2S/CO_2$ absorber.

12 Claims, 1 Drawing Sheet

U.S. PATENT DOCUMENTS

| | | | | |
|---|---|---|---|---|
| 4,511,668 A | * | 4/1985 | Nozue et al. | 502/84 |
| 4,810,475 A | * | 3/1989 | Chu et al. | 423/236 |
| 5,660,807 A | * | 8/1997 | Forg et al. | 423/236 |
| 7,935,324 B2 | * | 5/2011 | Serban et al. | 423/224 |
| 2010/0111784 A1 | * | 5/2010 | Mak et al. | 422/190 |

OTHER PUBLICATIONS

Maarten Van Der Burgt et al., "The Shell Middle Distillate Synthesis Process", Petroleum Review, Apr. 1990, pp. 204-209.

* cited by examiner

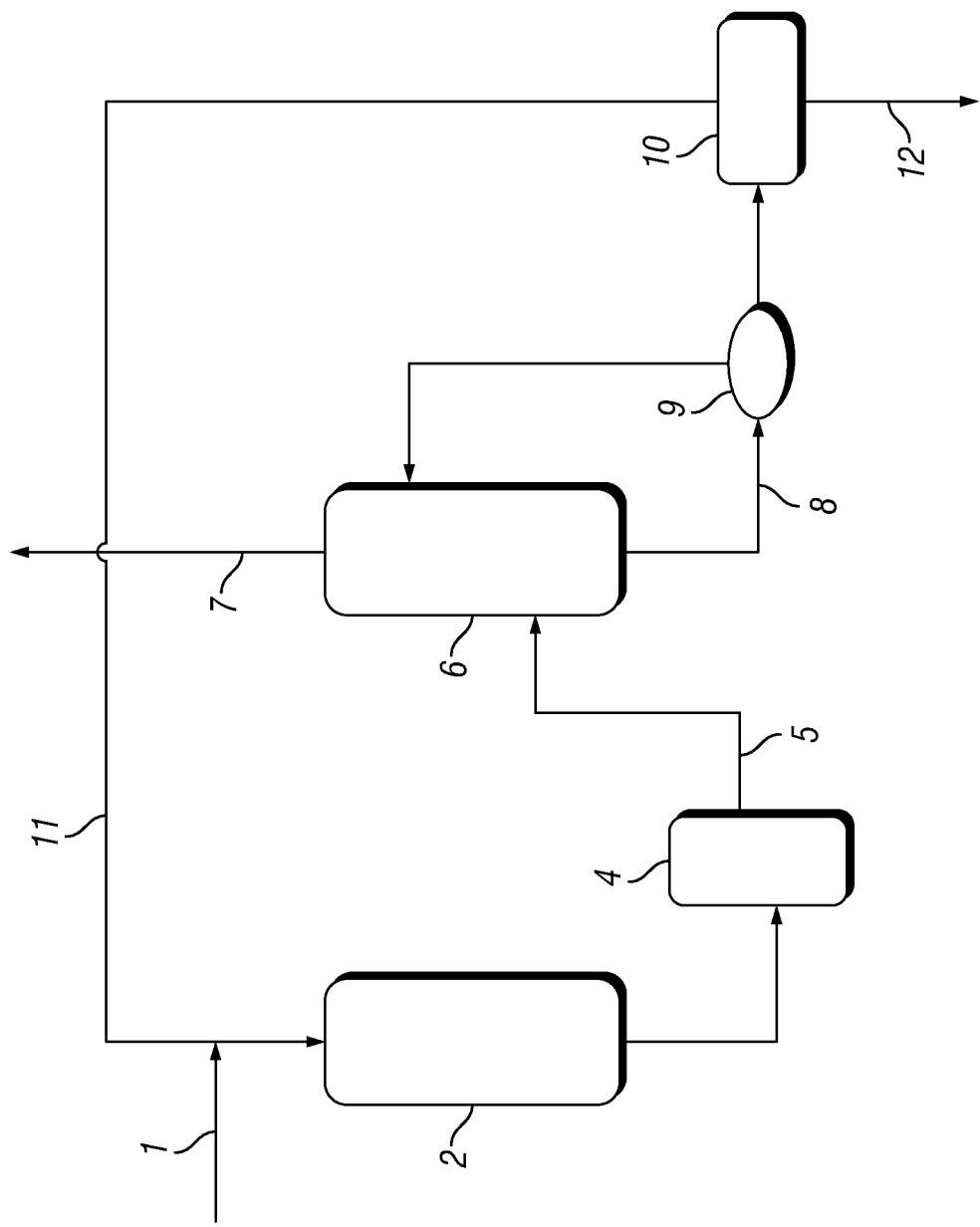

PROCESS FOR PRODUCING PURIFIED GAS FROM GAS COMPRISING $H_2S$, $CO_2$ AND HCN AND/OR COS

The present application claims priority from European Patent Application 07113576.8 filed 31 Jul. 2007.

The invention relates to a process for producing purified gas from gas comprising hydrogen sulphide ($H_2S$), carbon dioxide ($CO_2$) and hydrogen cyanide (HCN) and/or carbonyl disulphide (COS).

The gas can be natural gas, synthesis gas or a gas effluent.

Synthesis gas mainly comprises carbon monoxide and hydrogen. Synthesis gas is generally produced via partial oxidation or steam reforming of hydrocarbons including natural gas, coal bed methane, distillate oils and residual oil, and by gasification of solid fossil fuels such as coal or coke. Reference is made to Maarten van der Burgt et al., in "The Shell Middle Distillate Synthesis Process, Petroleum Review April 1990 pp. 204-209" for a general description on the preparation of gas.

Depending on the feedstock used to generate synthesis gas, the gas will contain contaminants such as carbon dioxide, hydrogen sulphide, carbonyl sulphide and carbonyl disulphide while also nitrogen, nitrogen-containing components, e.g. HCN and $NH_3$ and metal carbonyls may be present.

Numerous natural gas wells produce what is called "sour gas", i.e. natural gas comprising acidic compounds such as carbon dioxide and/or sulphur compounds such as $H_2S$, sulphides, disulphides and thiophenes. The total amount of acidic compounds is generally too high, making the natural gas unsuitable for direct use. Depending on the intended use of the natural gas, acidic compounds often have to be removed.

Because gas is generally further processed, for example to generate power in gas turbines, or in the case of synthesis gas used in catalytic conversion reactions, or in the case of natural gas transported via pipelines or cooled and liquefied to form liquefied natural gas, removal of contaminants to a certain levels is often desired.

Removal of HCN from gas streams is important not only because of its own toxic properties, but also in view of corrosive $NO_x$ compounds which can evolve when both HCN and oxygen are present in a gas stream. In addition, HCN itself is corrosive to equipment.

Processes to produce purified gas from gas comprising $H_2S$, $CO_2$ and HCN and/or COS are known in the art. For example, in U.S. Pat. No. 4,189,307 a process is described wherein HCN is removed from gas in an HCN absorber, followed by removal of $H_2S$ and/or $CO_2$ in an acid gas absorber. Purified gas leaves the acid gas absorber and absorbing liquid rich in $H_2S$ and $CO_2$ is regenerated by stripping with a stripping gas. The resulting stripping gas enriched in $H_2S$ and $CO_2$ is sent to a Claus unit, where $H_2S$ is converted to elemental sulphur by reacting with $SO_2$. However, in the event that the gas comprises a substantial amount of CO2, the stripping gas enriched with $H_2S$ and $CO_2$ will also comprise a substantial amount of $CO_2$. Because $CO_2$ is not converted in the Claus unit, an unnecessarily large Claus unit will be needed to handle the larger volume of Claus feed gas. In addition, the amount of $H_2S$ in the Claus feed gas will be relatively low, resulting in a less efficient Claus process.

Thus, there is a need for a simple process enabling producing a purified gas from gas comprising $H_2S$, $CO_2$ and HCN and/or COS without the disadvantages mentioned hereinabove.

To this end, the invention provides a process for producing purified gas from feed gas comprising $H_2S$, $CO_2$ and HCN and/or COS, the process comprising the steps of:

(a) contacting feed gas comprising $H_2S$, $CO_2$ and HCN and/or COS with a HCN/COS hydrolysis sorbent in the presence of water in a HCN/COS hydrolysis unit, thereby obtaining gas depleted in HCN and/or COS;

(b) contacting the gas depleted in HCN and/or COS with absorbing liquid in an $H_2S/CO_2$ absorber to remove $H_2S$ and $CO_2$, thereby obtaining the purified gas and absorbing liquid rich in $H_2S$ and $CO_2$;

(c) heating and de-pressurising at least part of the absorbing liquid rich in $H_2S$ and $CO_2$ to obtain hot flash gas enriched in $CO_2$ and absorbing liquid enriched in $H_2S$;

(d) contacting the absorbing liquid enriched in $H_2S$ at elevated temperature with a stripping gas, thereby transferring $H_2S$ to the stripping gas to obtain regenerated absorbing liquid and stripping gas rich in $H_2S$; and (e) leading at least part of the flash gas enriched in $CO_2$ to the HCN/COS hydrolysis unit and/or to the $H_2S/CO_2$ absorber.

FIG. 1 is a schematic representation of the process flow art system arrangement of an embodiment of the inventive process.

It has been found that by taking $CO_2$ from the absorbing liquid prior to regenerating the absorbing liquid, and sending the $CO_2$ back into the process, the $H_2S:CO_2$ ratio of the stripping gas resulting from the regeneration step can be improved.

The process enables producing a purified gas having lowered levels of contaminants. The purified gas, because of its lowered level of contaminants, especially with regard to HCN and/or COS, is suitable for many uses, especially for use as feedstock to generate power or for use in a catalytic reaction or for pipeline transportation.

Another advantage of the process is that a stripping gas rich in $H_2S$ and comprising little $CO_2$ is obtained, even when processing a feed gas stream comprising substantial amounts of $CO_2$. Suitably, the $H_2S$ concentration in stripping gas rich in $H_2S$ will be more than 30 volume %. Such a stripping gas is a suitable feed for a sulphur recovery unit, where $H_2S$ is converted to elemental sulphur. A high concentration of $H_2S$ in the feed to a sulphur recovery unit enables the use of a smaller sulphur recovery unit and thus a lower capital and operational expenditure. Therefore, the process offers additional advantages when used as part of an overall line-up comprising a sulphur recovery unit.

The feed gas may be natural gas, synthesis gas or a gas effluent.

Typically, feed synthesis gas is generated from a feedstock in a synthesis generation unit such as a high temperature reformer, an autothermal reformer or a gasifier. See for example Maarten van der Burgt et al., in "The Shell Middle Distillate Synthesis Process, Petroleum Review April 1990 pp. 204-209".

Apart from coal and heavy oil residues, there are many solid or very heavy (viscous) fossil fuels which may be used as feedstock for generating gas, including solid fuels such as anthracite, brown coal, bitumous coal, sub-bitumous coal, lignite, petroleum coke, peat and the like, and heavy residues, e.g. hydrocarbons extracted from tar sands, residues from refineries such as residual oil fractions boiling above 360° C., directly derived from crude oil, or from oil conversion processes such as thermal cracking, catalytic cracking, hydrocracking etc. All such types of fuels have different proportions of carbon and hydrogen, as well as different substances regarded as contaminants.

Synthesis gas generated in reformers comprises conventionally substantial amounts of carbon monoxide and hydrogen and further comprises carbon dioxide, steam, various inert compounds and impurities such as HCN and sulphur compounds. Gas generated in gasifiers conventionally comprises lower levels of carbon dioxide.

Synthesis gas exiting a gas generation unit may comprise particulate matter, for example soot particles. Preferably, these soot particles are removed, for example by contacting the gas exiting a gas generation unit with scrubbing liquid in a soot scrubber to remove particulate matter, in particular soot, thereby obtaining the feed gas comprising $H_2S$, $CO_2$ and HCN and/or COS.

It will be understood that the amount of $H_2S$, $CO_2$ and HCN and/or COS in the feed gas can vary.

Suitably, the amount of $H_2S$ in the feed gas will be in the range of from 1 ppmv to 20 volume %, typically from 1 ppmv to 10 volume %, based on the gas.

Generally, the amount of $CO_2$ in the feed gas is from about 0.5 to 10 vol %, preferably from about 1 to 10 vol %, based on the gas. The process is especially useful when a substantial amount of $CO_2$, especially at least 0.5 volume % of $CO_2$, is present.

If HCN is present, the amount of HCN in the feed gas will generally be the range of from about 1 ppbv to about 500 ppmv.

If COS is present, the amount of COS in the feed gas will generally be in the range of from about 1 ppbv to about 50 ppmv.

In step (a), the feed gas is contacted with HCN/COS hydrolysis sorbent. Suitable HCN hydrolysis sorbents comprise an HCN/COS hydrolysis catalyst.

In one preferred embodiment, the HCN hydrolysis sorbent comprises one or more oxides of a metal selected from Group VI and Group IVB of the Periodic Table of the Elements, more preferably from Group IVB (Zr, Ti, Hf). References to the Periodic Table and groups thereof used herein refer to the previous IUPAC version of the Periodic Table of Elements such as that described in the 68th Edition of the Handbook of Chemistry and Physics (CRC Press). Oxides of alumina and at least one of Mo and Ti are especially preferred.

To increase the surface area available for contact with the feed gas, the pore volume and/or pore diameter it is preferred that the HCN hydrolysis sorbent is supported on support material, especially an inorganic support material. Preferably, support material selected from the group of alumina, silica, titania, zirconia, carbon, silicon carbide and kieselguhr is used. Either one type of support material can be used or mixtures of different support materials can be used.

In a preferred embodiment, the HCN hydrolysis sorbent comprises alumina. It has been found that the presence of alumina results in an even better removal of COS. Preferably, the amount of alumina present in the HCN hydrolysis sorbent is in the range of from 0.1 to 5 wt %, more preferably from 0.1 to 3 wt %, based on total HCN hydrolysis sorbent.

Preferably, step (a) is performed at a temperature in the range of from 80 to 250° C., more preferably from 100° C. to 240° C. It has been found that at the preferred temperatures, removal of HCN to levels in the ppbv range, even as low as below 10 ppbv can be achieved.

Preferably, step (a) is performed at a pressure in the range of from 1 to 100 bara, preferably from 20 to 80 bara, more preferably from 40 to 60 bara.

The gas space velocity may be similar to current processes, for example in the range 1,000-100,000/h, preferably approximately 10,000-20,000/h.

After step (a), gas depleted in HCN and/or in COS is obtained. It will be understood that the amounts of HCN and/or COS in the gas depleted in HCN and/or COS will depend on the amount of these contaminants in the feed gas. Preferably, the amount of HCN in the gas depleted in HCN and/or COS is less than 50%, more preferably less than 30% and even more preferably less than 10% of the amount of HCN in the feed gas. Preferably, the amount of COS in the gas depleted in HCN and/or COS is less than 50%, more preferably less than 30% and even more preferably less than 10% of the amount of COS in the feed gas.

In step (b), the gas depleted in HCN and/or COS is contacted with absorbing liquid in an absorber to remove $H_2S$ and $CO_2$, thereby obtaining purified gas and absorbing liquid rich in $H_2S$ and $CO_2$.

Suitable absorbing liquids may comprise physical solvents and/or chemical solvents. Physical solvents are understood to be solvents that show little or no chemical interaction with $H_2S$ and/or $CO_2$. Suitable physical solvents include sulfolane (cyclo-tetramethylenesulfone and its derivatives), aliphatic acid amides, N-methyl-pyrrolidone, N-alkylated pyrrolidones and the corresponding piperidones, methanol, ethanol and mixtures of dialkylethers of polyethylene glycols. Chemical solvents are understood to be solvents that can show chemical interaction with $H_2S$ and/or $CO_2$. Suitable chemical solvents include amine type solvents, for example primary, secondary and/or tertiary amines, especially amines that are derived of ethanolamine, especially monoethanol amine (MEA), diethanolamine (DEA), triethanolamine (TEA), diisopropanolamine (DIPA) and methyldiethanolamine (MDEA) or mixtures thereof.

A preferred absorbing liquid comprises a physical and a chemical solvent.

An advantage of using absorption liquids comprising both a chemical and a physical solvent is that they show good absorption capacity and good selectivity for $H_2S$ and/or $CO_2$ against moderate investment costs and operational costs.

An especially preferred absorbing liquid comprises a secondary or tertiary amine, preferably an amine compound derived from ethanol amine, more especially DIPA, DEA, MMEA (monomethyl-ethanolamine), MDEA, or DEMEA (diethyl-monoethanolamine), preferably DIPA or MDEA.

Preferably, the operating conditions of the absorber in step (b) are chosen such that $H_2S$ is absorbed preferentially with respect to $CO_2$. This can for example be achieved by adjusting the temperature, pressure, gas/liquid contact time or packing of the absorber. Another way of enabling preferential absorption of $H_2S$ with respect to $CO_2$ is by choosing a specific type of absorbing liquid. A preferred absorbing liquid comprises a dialkylether of polyethylene glycol. Another preferred absorbing liquid comprises sulfolane and an amine compounds, especially MDEA.

Step (b) is preferably performed at a temperature in the range of from in the range of from 15 to 90° C., more preferably at a temperature of at least 20° C., still more preferably from 25 to 80° C., even more preferably from 40 to 65° C., and most preferably at about 55° C. At the preferred temperatures, better removal of $H_2S$ and $CO_2$ is achieved. Step (a) is suitably carried out at a pressure in the range of from 15 to 90 bara, preferably from 20 to 80 bara, more preferably from 30 to 70 bara.

Step (b) is suitably carried out in a zone having from 5-80 contacting layers, such as valve trays, bubble cap trays, baffles and the like. Structured packing may also be applied. A suitable solvent/feed gas ratio is from 1.0 to 10 (w/w), preferably between 2 and 6 (w/w).

Step (b) results in purified gas and absorbing liquid rich in $H_2S$ and/or $CO_2$.

The purified gas obtained in step (b) comprises lowered levels of HCN, $NH_3$ and optionally $H_2S$ and/or COS.

The amount of contaminants in the purified gas depends on the conditions used in steps (a) and (b). The conditions in steps (a) and (b) can be adjusted to achieve a certain degree of purification, depending on the amount of contaminants present in the feed gas and depending on the intended use of the purified gas.

The purified gas obtainable by the process is suitable for many uses, including generation of power or conversion in chemical processes (for synthesis gas) or pipeline transportation or liquefication into liquefied natural gas (for natural gas).

In a preferred embodiment, the purified gas is used to generate power. This is suitably done by combusting the purified gas and using the resulting hot combustion gas to generate power. The hot combustion gas can for example be heat exchanged with one or more water streams to provide one or more steam streams and the one or more steam streams can then be used to drive one or more steam turbines. If the purified gas is intended to be used to generate power, the total amount of sulphur-containing contaminants such as $H_2S$ and if applicable COS in the purified gas is suitably below 30 ppmv, preferably below 20 ppmv.

Alternatively, if the purified gas is synthesis gas intended to be used in catalytic conversions, the amount of HCN is generally below 1 ppmv, preferably below 50 ppbv, more preferably below 20 ppbv, still more preferably below 10 ppbv, based on the purified synthesis gas. It will be understood that the lower level of HCN depends on the analytical techniques used to determine the amount of HCN. Generally, a detection limit of about 5-7 ppbv applies. In the most preferred embodiment, the amount of HCN in the purified gas is below the detection limit of HCN.

If applicable, the amount of COS in purified synthesis gas intended to be used in catalytic conversions is preferably 500 ppbv or less, more preferably 100 ppbv or less, based on the purified gas.

The amount of $H_2S$ in purified synthesis gas intended to be used in catalytic conversions is preferably 1 ppmv or less, more preferably 100 ppbv or less, still more preferably 10 ppbv or less and most preferably 5 ppbv or less, based on the purified gas.

One possible use of the purified synthesis gas in a catalytic conversion is for the preparation of hydrocarbons, in particular via Fischer-Tropsch reactions or processes. Catalysts for use in the Fischer Tropsch reaction frequently comprise, as the catalytically active component, a metal from Group VIII of the Periodic Table of Elements. Particular catalytically active metals include ruthenium, iron, cobalt and nickel. Cobalt is a preferred catalytically active metal.

In step (c), at least part of the absorbing liquid rich in $H_2S$ and $CO_2$ is heated and de-pressurised to obtain hot flash gas enriched in $CO_2$ and absorbing liquid enriched in $H_2S$.

One way of performing step (c) is by first heating at least part of the absorbing liquid rich in $H_2S$ and/or $CO_2$, followed by de-pressurising the heated absorbing liquid in a flash vessel, thereby obtaining flash gas enriched in $CO_2$ and absorbing liquid enriched in $H_2S$.

Another way of performing step (c) is by first de-pressurising at least part of the absorbing liquid rich in $H_2S$ and/or $CO_2$, followed by heating the absorbing liquid in a flash vessel, thereby obtaining flash gas enriched in $CO_2$ and absorbing liquid enriched in $H_2S$.

Suitably, the absorbing liquid is heated to a temperature in the range of from 90 to 120° C.

Suitably, de-pressurising is carried out at a lower pressure compared to the pressure in step (b), but preferably at a pressure above atmospheric pressure. Suitably, the de-pressurising is done such that a certain amount of $CO_2$ is released from the heated absorbing liquid. Preferably, de-pressurising is carried out at a pressure in the range of from 1.5 bara to 5 bara, more preferably from 2 bara to 3 bara. It has been found that at these preferred pressures, a large part of the $CO_2$ is separated from the absorbing liquid enriched in $H_2S$ and/or $CO_2$, resulting in flash gas comprising mainly $CO_2$.

Suitably, step (c) results in separating at least 50%, preferably at least 70% and more preferably at least 80% of the $CO_2$ from the absorbing liquid enriched in $H_2S$ and/or $CO_2$. Step (c) results in flash gas enriched in $CO_2$ and absorbing liquid enriched in $H_2S$.

In step (d), the absorbing liquid comprising $H_2S$ is contacted at elevated temperature with a stripping gas, thereby transferring $H_2S$ to the stripping gas to obtain regenerated absorbing liquid and stripping gas rich in $H_2S$. Step (d) is suitably carried out in a regenerator. Preferably, the elevated temperature in step (d) is a temperature in the range of from 70 to 150° C. The heating is preferably carried out with steam or hot oil. Preferably, the temperature increase is done in a stepwise mode. Suitably, step (d) is carried out at a pressure in the range of from 1 to 3 bara, preferably from 1 to 2.5 bara.

In step (e), at least part of the flash gas comprising $CO_2$ is led to the HCN/COS hydrolysis unit and/or to the $H_2S/CO_2$ absorber. Preferably, at least 80%, more preferably at least 90%, still more preferably all of the flash gas enriched in $CO_2$ is led to the HCN/COS hydrolysis unit and/or to the $H_2S/CO_2$ absorber.

Suitably, the flash gas obtained in step (d) comprises in the range of from 10 to 90 volume % of $CO_2$, preferably from 50 to 90 volume % of $CO_2$.

In the event that the feed gas comprises HCN and little or no COS, the flash gas comprising $CO_2$ is preferably led to the $H_2S/CO_2$ absorber. In the absence of a substantial amount of COS, the flash gas will mostly comprise $CO_2$ and little or no COS. Thus, the flash gas comprising $CO_2$ can be routed to the $H_2S/CO_2$ absorber as no removal of COS is needed. This enables the use of a smaller HCN/COS hydrolysis unit.

In the event that the feed gas comprises a substantial amount of COS, the feed synthesis is preferably led to the HCN/COS hydrolysis unit. This enables further removal of COS in order to prevent or reduce build-up of COS in the process. Reference herein to a substantial amount of COS is to an amount in the range of from 1 ppmv to 500 ppmv, based on the feed gas.

The invention will now be illustrated using the following non-limiting embodiment with reference to the schematic FIGURE.

In the process of FIG. 1, gas comprising $H_2S$, $CO_2$, HCN and COS is led via line 1 to HCN/COS hydrolysis unit 2, where hydrolysis of HCN and COS takes place. The resulting gas, depleted in HCN and in COS, is optionally washed in scrubber 4 to remove any $NH_3$ formed and led via line 5 to an absorber 6. In absorber 6, the gas depleted in HCN and in COS is contacted with absorbing liquid, thereby transferring $H_2S$ and $CO_2$ from the gas to the absorbing liquid to obtain absorbing liquid rich in $H_2S$ and $CO_2$ and purified gas. The purified gas leaves absorber 6 via line 7. The absorbing liquid rich in $H_2S$ and $CO_2$ is led via line 8 to heater 9, where it is heated. The resulting heated absorbing liquid is de-pressurised in flash vessel 10, thereby obtaining flash gas rich in $CO_2$ and absorbing liquid rich in $H_2S$. The flash gas rich in $CO_2$ is led via line 11 to HCN/COS hydrolysis unit 2. The absorbing liquid rich in $H_2S$ is led to a regenerator 12, where it is contacted at elevated temperature with a stripping gas, thereby transferring $H_2S$ to the stripping gas to obtain regenerated absorbing liquid and stripping gas rich in $H_2S$. The resulting stripping gas rich in $H_2S$ can then be led to a sulphur recovery unit (not shown).

What is claimed is:

1. A process for producing a purified gas from a feed gas comprising $H_2S$, $CO_2$ and a contaminant of either HCN or COS, or both, the process comprising the steps of:
   (a) contacting the feed gas with a HCN/COS hydrolysis sorbent in the presence of water in a HCN/COS hydrolysis unit, thereby obtaining gas depleted in the contaminant;
   (b) contacting the gas depleted in the contaminant with an absorbing liquid in an $H_2S/CO_2$ absorber to remove $H_2S$ and $CO_2$, thereby obtaining the purified gas and an absorbing liquid rich in $H_2S$ and $CO_2$;
   (c) heating and de-pressurising at least part of the absorbing liquid rich in $H_2S$ and $CO_2$ to obtain a hot flash gas enriched in $CO_2$ and an absorbing liquid enriched in $H_2S$;
   (d) contacting the absorbing liquid enriched in $H_2S$ at elevated temperature with a stripping gas, thereby transferring $H_2S$ to the stripping gas to obtain a regenerated absorbing liquid and a stripping gas rich in $H_2S$; and
   (e) leading at least part of the hot flash gas enriched in $CO_2$ to the HCN/COS hydrolysis unit.

2. A process according to claim 1, wherein the stripping gas rich in $H_2S$ is led to a sulphur recovery unit, wherein $H_2S$ is converted to elemental sulphur.

3. A process according to claim 2, wherein at least 80 of the flash gas enriched in $CO_2$ is led to the HCN/COS hydrolysis unit.

4. A process according to claim 1, further comprising the step of leading at least part of the hot flash gas to the $H_2S/CO_2$ absorber, and wherein the feed gas comprises HCN and little or no COS.

5. A process according to claim 1, wherein the operating conditions of the $H_2S/CO_2$ absorber in step (b) are chosen such that $H_2S$ is absorbed preferentially with respect to $CO_2$.

6. A process according to claim 1, wherein the stripping gas rich in $H_2S$ comprises in the range of from 30 to 90 volume % of $H_2S$.

7. A process according to claim 1, wherein the feed gas comprises at least 0.5 volume % of $CO_2$.

8. A process according to claim 1, wherein step (c) is performed at a temperature in the range of from 90 to 120° C. and a pressure in the range of from 2 to 4 bara.

9. A process according to claim 1, wherein the hot flash gas obtained in step (c) comprises in the range of from 10 to 90 volume % of $CO_2$.

10. A process according to claim 1, wherein the purified gas is used to generate power.

11. A process for producing a purified gas from a feed gas comprising $H_2S$, $CO_2$ and a contaminant of either HCN or COS, or both, the process comprising the steps of:
   (a) contacting the feed gas with a HCN/COS hydrolysis sorbent in the presence of water in a HCN/COS hydrolysis unit, thereby obtaining gas depleted in the contaminant;
   (b) contacting the gas depleted in the contaminant with an absorbing liquid in an $H_2S/CO_2$ absorber to remove $H_2S$ and $CO_2$, thereby obtaining the purified gas and an absorbing liquid rich in $H_2S$ and $CO_2$;
   (c) heating and de-pressurising at least part of the absorbing liquid rich in $H_2S$ and $CO_2$ to obtain a hot flash gas enriched in $CO_2$ and an absorbing liquid enriched in $H_2S$;
   (d) contacting the absorbing liquid enriched in $H_2S$ at elevated temperature with a stripping gas, thereby transferring $H_2S$ to the stripping gas to obtain a regenerated absorbing liquid and a stripping gas rich in $H_2S$; and
   (e) leading at least part of the hot flash gas enriched in $CO_2$ to the HCN/COS hydrolysis unit;
wherein the operating conditions of the $H_2S/CO_2$ absorber in step (b) are chosen such that $H_2S$ is absorbed preferentially with respect to $CO_2$; wherein the stripping gas rich in $H_2S$ comprises in the range of from 30 to 90 volume % of $H_2S$; wherein the feed gas comprises at least 0.5 volume % of $CO_2$; wherein step (c) is performed at a temperature in the range of from 90 to 120° C. and a pressure in the range of from 2 to 4 bara; and, wherein the hot flash gas obtained in step (c) comprises in the range of from 10 to 90 volume % of $CO_2$.

12. A process recited in claim 11, further comprising the step of leading at least a part of thee flash gas to the $H_2S/CO_2$ absorber.

* * * * *